(12) United States Patent
Hill (10) Patent No.: US 10,576,594 B2
(45) Date of Patent: Mar. 3, 2020

(54) CENTER POINT DRILL AND CENTER POINT DRILL ATTACHMENT

(71) Applicant: Michael Paul Hill, Peoria, AZ (US)

(72) Inventor: Michael Paul Hill, Peoria, AZ (US)

( * ) Notice: Subject to any disclaimer, the term of this patent is extended or adjusted under 35 U.S.C. 154(b) by 55 days.

(21) Appl. No.: 15/940,866

(22) Filed: Mar. 29, 2018

(65) Prior Publication Data

US 2018/0345432 A1 Dec. 6, 2018

Related U.S. Application Data

(60) Provisional application No. 62/478,108, filed on Mar. 29, 2017.

(51) Int. Cl.
| | |
|---|---|
| *B23B 45/02* | (2006.01) |
| *B23Q 5/04* | (2006.01) |
| *B25F 5/02* | (2006.01) |
| *F16H 1/14* | (2006.01) |
| *B25B 21/00* | (2006.01) |
| *B23B 45/00* | (2006.01) |
| *B23B 39/00* | (2006.01) |

(52) U.S. Cl.
CPC ............ *B23Q 5/045* (2013.01); *B23Q 5/046* (2013.01); *B25B 21/002* (2013.01); *B25B 21/007* (2013.01); *B25F 5/02* (2013.01); *F16H 1/14* (2013.01); *B23B 39/006* (2013.01); *B23B 45/001* (2013.01); *B23B 45/02* (2013.01)

(58) Field of Classification Search
CPC ..... B23B 45/00; B23B 45/001; B23B 45/003; B23B 45/006; B23B 45/008; B23B 45/02; B23B 39/006; B23Q 5/045; B23Q 5/046; B25B 21/002; B25B 21/007; B25F 5/02; F16H 1/14; F16H 1/145
USPC ....................................................... 173/162.2
See application file for complete search history.

(56) References Cited

U.S. PATENT DOCUMENTS

| | | | | |
|---|---|---|---|---|
| 2,229,509 A | * | 1/1941 | Koza ................... | B23B 45/00 74/423 |
| 2,348,266 A | | 5/1944 | Selby | |
| 2,780,942 A | * | 2/1957 | Babcock ............... | B23Q 5/045 74/417 |
| 3,120,845 A | * | 2/1964 | Horner ............... | A61B 17/1624 606/180 |
| 3,152,650 A | | 10/1964 | Savidge | |
| 3,456,740 A | * | 7/1969 | Bronnert ............... | B25D 17/00 173/109 |
| 5,445,479 A | * | 8/1995 | Hillinger ............... | B25F 5/00 16/430 |
| 5,540,629 A | | 7/1996 | Gotman | |
| D388,676 S | | 1/1998 | Niwa et al. | |

(Continued)

FOREIGN PATENT DOCUMENTS

EP 1952947 A1 * 8/2008 ........... B23B 39/205

*Primary Examiner* — Alan Snyder
*Assistant Examiner* — Yasir A Diab
(74) *Attorney, Agent, or Firm* — Zeman-Mullen & Ford, LLP (57) ABSTRACT

A newly configured centerpoint drill and a drill attachment device that can be attached to a conventional cordless drill include configurations that require a user's hand to be in direct alignment with the keyless chuck of the drill to enable a user or operator to apply maximum pressure or force during use of a drill to reduce time and effort spent by a user/operator.

11 Claims, 7 Drawing Sheets

(56) References Cited

U.S. PATENT DOCUMENTS

| | | | | |
|---|---|---|---|---|
| 6,543,549 B1* | 4/2003 | Riedl | .................. | B25B 21/00 173/171 |
| 6,763,897 B2 | 7/2004 | Hanke et al. | | |
| 6,962,211 B2 | 11/2005 | Daubner | | |
| D531,476 S | 11/2006 | Kokawa et al. | | |
| 7,191,677 B2 | 3/2007 | Barkdoll | | |
| 7,670,328 B2* | 3/2010 | Miller | .................. | A61B 10/025 604/506 |
| 7,997,835 B2* | 8/2011 | Whitehead | ............ | B23B 39/205 408/16 |
| 2003/0225344 A1* | 12/2003 | Miller | .................. | A61B 10/025 600/568 |
| 2004/0013486 A1* | 1/2004 | Cooper | .................. | B25F 5/006 408/241 R |
| 2004/0124721 A1* | 7/2004 | Pfisterer | ................ | B25D 17/20 310/51 |
| 2004/0226731 A1* | 11/2004 | Faatz | ...................... | B25F 5/008 173/217 |
| 2005/0048884 A1* | 3/2005 | Baker | .................. | B23B 45/003 451/358 |
| 2006/0144604 A1* | 7/2006 | Soika | .................... | B25D 16/00 173/162.2 |
| 2008/0003070 A1* | 1/2008 | Hor | .................. | B25F 5/001 408/124 |
| 2009/0022557 A1* | 1/2009 | Whitehead | ............ | B23B 39/205 408/35 |
| 2011/0088922 A1* | 4/2011 | Hirayama | ................ | B25F 5/02 173/90 |
| 2012/0024096 A1* | 2/2012 | Adkins | ................ | B23B 45/003 74/416 |
| 2012/0266709 A1* | 10/2012 | Wang | .................. | B25B 15/001 74/417 |
| 2013/0020105 A1 | 1/2013 | Cook | | |
| 2015/0343583 A1* | 12/2015 | McRoberts | ............ | B23Q 5/045 173/213 |

\* cited by examiner

CENTER POINT DRILL AND CENTER POINT DRILL ATTACHMENT

CROSS-REFERENCE TO RELATED APPLICATIONS

This application claims priority to provisional patent application having Ser. No. 62/478,108, filed Mar. 29, 2017, which is herein incorporated by reference in its entirety.

FIELD OF INVENTION

The present invention is generally directed to a center point drill and a center point drill attachment that can be attached to a power drill for enabling a user to apply maximum force during use of the drill. The center point drill attachment includes a vertical elongated housing, a series of gears contained within the housing, a short shaft extending from a back exterior of the housing that is capable of being attached to the chuck of a standard power drill, a quick release chuck or keyless chuck positioned on a front exterior of the housing that is connected to the series of gears, and an attachment mechanism for attaching the center point drill attachment to the bottom of a standard power drill.

The center point drill is a cordless power drill having the keyless chuck or the quick release chuck of a standard power drill moved down across from the center of the drill handle right in front of the operator's fist. The drill includes a generally triangular shaped housing having a middle opening large enough to inert a user's fingers therethrough which appears like a generally triangular ring like shape. A battery is contained within one side of the triangular ring shaped housing, a motor and gearbox are contained within another side of the triangular ring shaped housing, and a trigger mechanism is contained within the last side of the triangular ring shaped housing. A quick release chuck is located on the flattened face of an exterior corner of the triangular ring shaped housing so that at least part of the trigger mechanism is in longitudinal alignment with the chuck. The activation trigger for the center point drill can be a standard switch system equipped with a heat sink, terminals, and a forward/reverse switch. The motor, separate gears, and battery for the center point drill may also be standard items.

BACKGROUND OF THE INVENTION

Cordless power tools were invented by Black & Decker back in the early 1960s and reduced the amount of time that a contractor had to spend on a job because they could just grab a power tool and screw, drill, or cut within a few seconds. The reduced amount of time spent on jobs meant that builders could move onto the next job more quickly and could increase the number of jobs they did per year.

Over the past decades, the volt size of the batteries, the range of tools that are cordless, and the weight of cordless power tools have changed. This is due to the advancement in different technologies such as battery technologies and the material compositions used to make the power tools.

Cordless drills commonly have a pistol grip and are also available in the hammer drill configuration. Most have a clutch, which aids in driving screws into various substrates while not damaging them. Right angle drills are also available which allow a worker to drive screws in a tight space. However, currently used cordless drills fail to provide a configuration in which a user can apply the greatest pressure or force when drilling or attaching screws, thereby reducing the time and effort required by the user to complete a job. Reducing the time and effort required by the user also reduces user fatigue.

Accordingly, there is a need for a cordless drill and a cordless drill attachment capable of being attached to a conventional cordless drill that include a configuration that enables a user to apply maximum pressure or force during use to reduce time and effort spent by a user.

SUMMARY OF THE INVENTION

The present invention is directed to a drill attachment that can be attached to a conventional cordless drill and a new cordless drill configuration that requires a user's hand to be in direct alignment with the keyless chuck or the quick release chuck of the drill (these chucks allow for the easy change of drill bits). This configuration enables a drill user to apply maximum pressure or force during use to reduce time and effort spent by the user thereby resulting in faster completion of jobs and reduced user fatigue.

A key component of the invention is a series of gears or a planetary gear system that enables a quick release chuck or keyless chuck associated with the drill to be positioned right in front of a user's or operator's hand or fist. The drill attachment device of the present invention includes 1) a vertical elongated housing having a top and a bottom, 2) a first gear contained within the housing near the top of the housing, 3) a first short shaft having a first end attached to the first gear and a second end capable of being attached to a chuck of a drill or drilling tool, 4) an elongated drive shaft having a top end and a bottom end vertically positioned within the housing and contained within a top half of the housing, 5) a second gear connected to the top end of the drive shaft so that the second gear is in communication with the first gear, 6) a third gear connected to the bottom end of the drive shaft, 7) a fourth gear located within the housing near a center of the housing such that the fourth gear is in communication with the third gear, 8) a second short shaft having a first end and a second end where the first end is connected to the fourth gear, 9) a quick release chuck or keyless chuck connected to the second end of the second short shaft, and 10) an attachment member connected to an exterior of the housing near the bottom of the housing for connecting the bottom of the housing to a drill or drilling tool.

The first, second, third, and fourth gears may all be bevel gears or spine gears. The tooth-bearing faces of the bevel gears are conically shaped and the teeth may be straight or curved. Spline gears have ridges or teeth that mesh with an equal number of like ridges or teeth. The drill attachment device may also include an adjustment screw mechanism so that the bottom half of the drill attachment device can be raised or lowered depending on the size of the existing drill or drilling tool that you are attaching it to. The screw tightens the adjustment mechanism that slides up and down. The vertical elongated housing is narrow in width, i.e. it is clearly considerably longer/higher than it is wide. The quick release chuck or keyless chuck is located on a front exterior of the housing. The attachment member extends from a back exterior of the housing. The attachment member may be one or more spring clip members that can easily be used to clip the bottom of the drill attachment device to the bottom of a standard drill or drilling tool. The gear system (namely the first, second, third, and fourth gears as well as the elongated drive shaft and first and second short shafts) may all be contained within an oil bath contained within the housing.

The oil bath may comprise only a portion of the interior of the housing such as the top half of the housing.

The center point drill of the present invention includes a generally triangular ring shaped housing having an opening in a middle of the housing large enough to insert a user's fingers therethrough, a battery contained within a first side of the generally triangular ring shaped housing, a motor, a driver, and a first gear contained within a second side of the generally triangular ring shaped housing, a second gear contained within a corner of the generally triangular ring shaped housing located between the first and second sides of the housing such that the second gear is in communication with the first gear, a quick release chuck in communication with the second gear wherein the quick release chuck is located on a flattened face of an exterior corner of the generally triangular ring shaped housing, and a trigger mechanism contained within the third side of the generally triangular ring shaped housing wherein at least a portion of the trigger mechanism is located on an exterior surface of the middle opening of the generally triangular ring shaped housing. The middle opening of the generally triangular ring shaped housing may also have a generally triangular shape. The first and second gears of the center point drill may be bevel gears or spline gears.

The center point drill may also include a direction switch connected to the trigger mechanism to change the direction of rotation of the quick release chuck. The driver may include an impact spindle and an impact hammer located between the motor and first gear as well as reduction gears. The spindle and reduction gears may include splines that mesh with one another to transfer torque from one to the other. The spindle and reduction gears may also be bevel gears. In one aspect of the invention, at least a portion of the trigger mechanism contained within the third side of the generally triangular ring shaped housing is in longitudinal alignment with the quick release chuck. An outer exterior surface of the third side of the generally triangular ring shaped housing containing the trigger mechanism may be slightly rounded to accommodate a user's grip when the user's fingers are placed through the middle opening of the generally triangular ring shaped housing.

The battery in the center point drill may be contained within a compartment within the housing that is accessible form an exterior of the housing for easy battery removal and replacement. The generally triangular ring shaped housing may be made of top and bottom halves that can be secured to one another with screws. The generally triangular ring shaped housing may also include a number of openings in top and bottom surfaces of the housing located near where the motor is contained within the housing in order to vent heat from an interior of the housing.

DESCRIPTION OF EXEMPLARY EMBODIMENTS

The present invention is directed to a newly configured center point drill that positions a user's hand in direct alignment with the chuck of the drill which enables a user or operator to apply maximum pressure or force while using the drill thereby reducing time and effort spent by the user/operator. The configuration of the center point drill of the present invention also balances the weight of the heaviest components of the drill thereby making it easier and less cumbersome to use without the hand, wrist and arm fatigue experienced with prior art drills. The present invention is also directed to a center point drill attachment device which enables a user/operator to attach the device to any existing drill or drilling tool to attain a position with their hand that is in direct alignment with the chuck of a drill thereby facilitating efficient use of the drill while reducing user fatigue.

Figure 1:
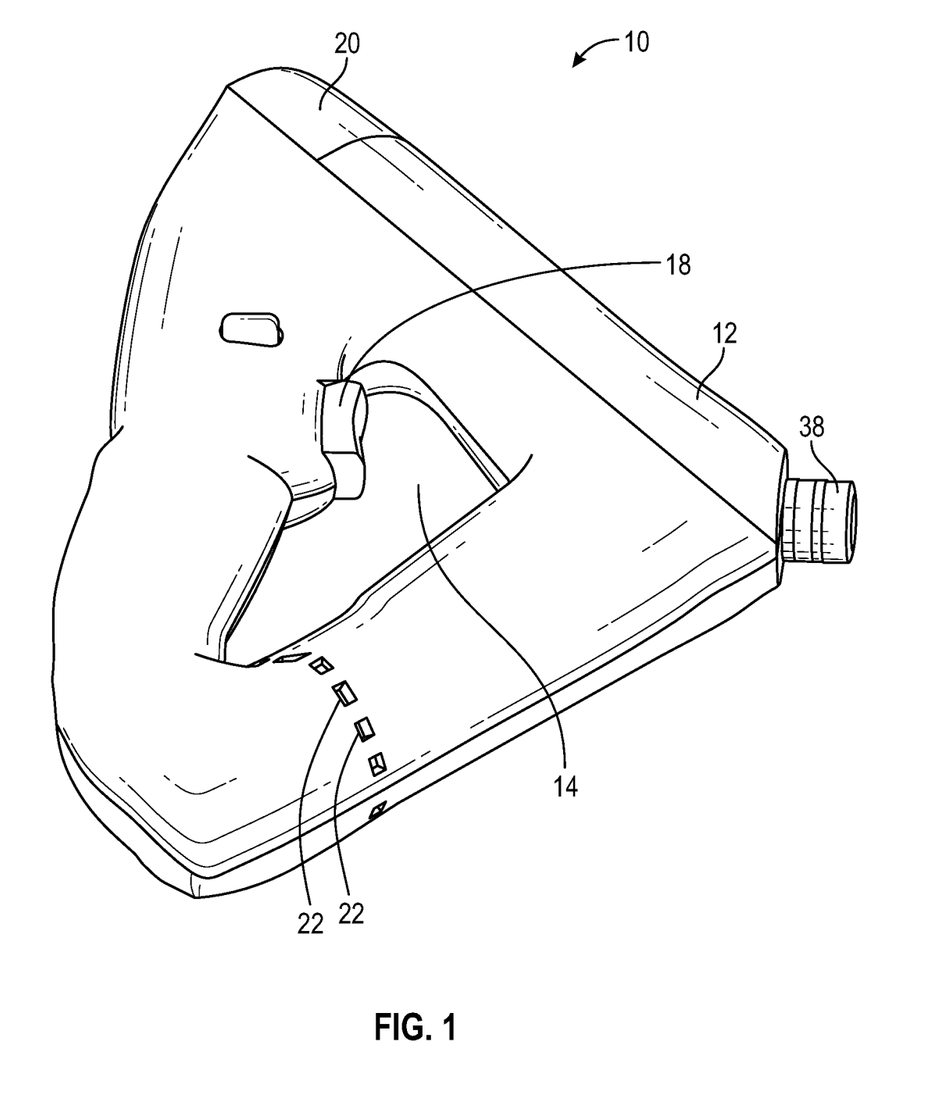
FIG. 1 is a perspective view of one exemplary embodiment of the center point drill of the present invention.

A perspective view of one exemplary embodiment of the center point drill 10 of the present invention is shown in FIG. 1. As shown in FIG. 1, center point drill 10 has a housing 12 having a generally triangular ring shaped configuration with an opening 14 in the middle that is large enough for a user to insert their fingers through it so that the drill 10 can be properly gripped for use. Middle opening 14 may also have a generally triangular shape. The outer perspective view of the drill 10 shown in FIG. 1 also shows a quick release chuck 38 (such as a quick release hex bit chuck), an activation trigger 18, a removable access door 20 to access the battery used with the cordless drill 10, and a plurality of small openings 22 located near the motor contained within the housing 12 which function to vent heat from the interior of the housing 12.

Figure 2:
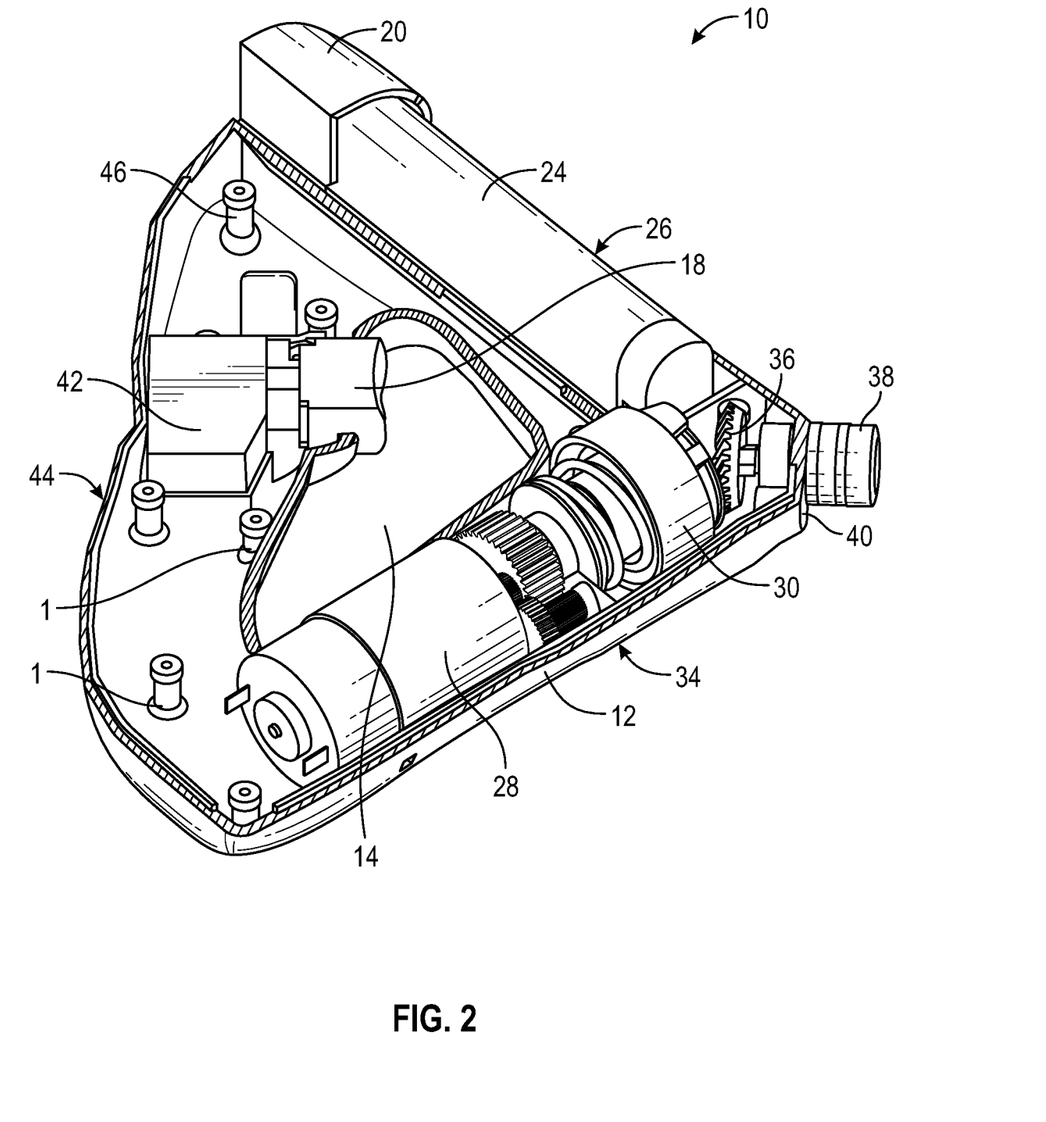
FIG. 2 is a perspective view of the interior and interior components of the center point drill of the present invention shown in FIG. 1.

FIG. 2 is a perspective view of the interior and interior components of the center point drill 10 of the present invention shown in FIG. 1 with the top of the housing 12 shown cut away or removed. Center point drill 10 includes a battery 24 contained within a first side 26 of the generally triangular ring shaped housing 12 and a motor 28, a driver 30, and a first gear 32 (see FIG. 3) contained within a second side 34 of the generally triangular ring shaped housing 12. A second gear 36 is contained within a corner of the generally triangular ring shaped housing 12 located between the first and second sides 26, 34 of the housing 12 such that the second gear 36 is in communication with the first gear 32 (see FIG. 3). A quick release chuck 38 is in communication with the second gear 36 and the quick release chuck 38 is located on a flattened face of an exterior corner 40 of the generally triangular shaped housing 12. A trigger mechanism 42 is contained within a third side 44 of the generally triangular ring shaped housing 12 where at least a portion of the trigger mechanism 42, such as the activation trigger 18, is located on an exterior surface of the middle opening 14 of the generally triangular ring shaped housing 12. An outer exterior surface of the third side 42 of the generally triangular ring shaped housing 12 containing the trigger mechanism 42 may be slightly rounded and/or indented in areas to comfortably accommodate a user's grip when the user's fingers are placed through middle opening 14. The generally triangular ring shaped housing 12 may include a top half and a bottom half that are secured together using a number of screw posts 46 contained within the housing and screws. Generally triangular ring shaped housing 12 is preferably made of a suitable lightweight material such as a polymer material or light weight metal like aluminum, for example, that is strong and durable and that can withstand heat and pressure.

Figure 3:
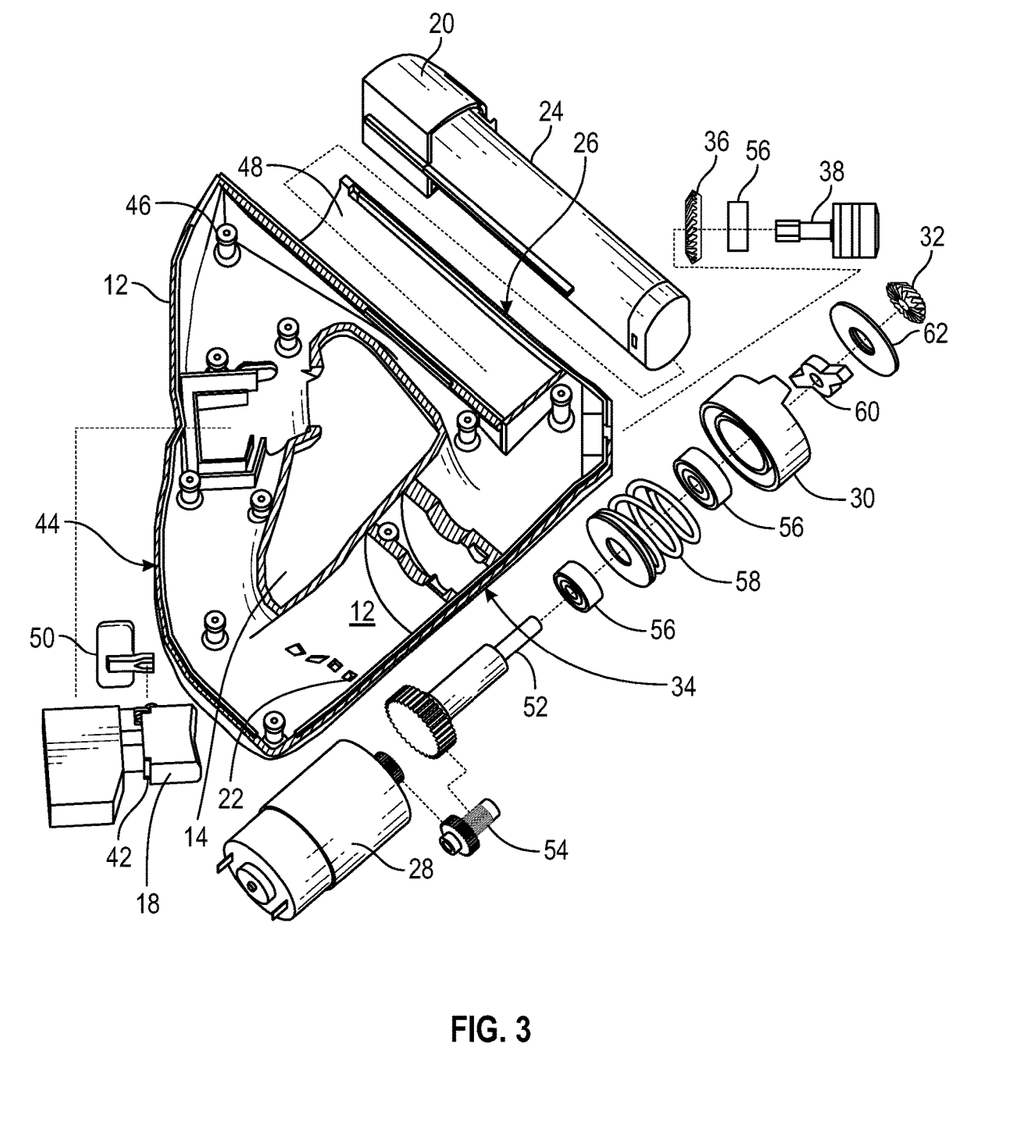
FIG. 3 is an exploded view of the center point drill of the present invention shown in FIG. 2.

FIG. 3 is an exploded view of the center point drill of the present invention shown in FIG. 2. As shown in FIG. 3, battery 24 may be contained within a compartment 48 contained within housing 12 that is easily accessible from an exterior of the housing 12 via removable access door 20. Center point drill 10 may also include direction switch 50 which may be connected to trigger mechanism 42 and which changes the direction of rotation of the chuck 38. As shown in the exemplary embodiment shown in FIG. 3, an impact spindle may be connected to motor 28 via reduction gears 54. Ball bearings 56 separated by an impact torsion spring 58 may be included between the impact spindle 52 and the driver/impact hammer 30. An impact anvil 60 and washers 62 may be inserted between the driver/impact hammer 30 and the first gear 32. In addition, a ball bearing 56 may be positioned between the second gear 36 and the quick release chuck 38. The first and second gears 32, 36 may be bevel gears or spline gears. At least a portion of the trigger mechanism 42 contained within the third side 44 of the triangular ring shaped housing 12 is in longitudinal alignment with the quick release chuck 38 (see FIG. 2).

Figures 4, 5:
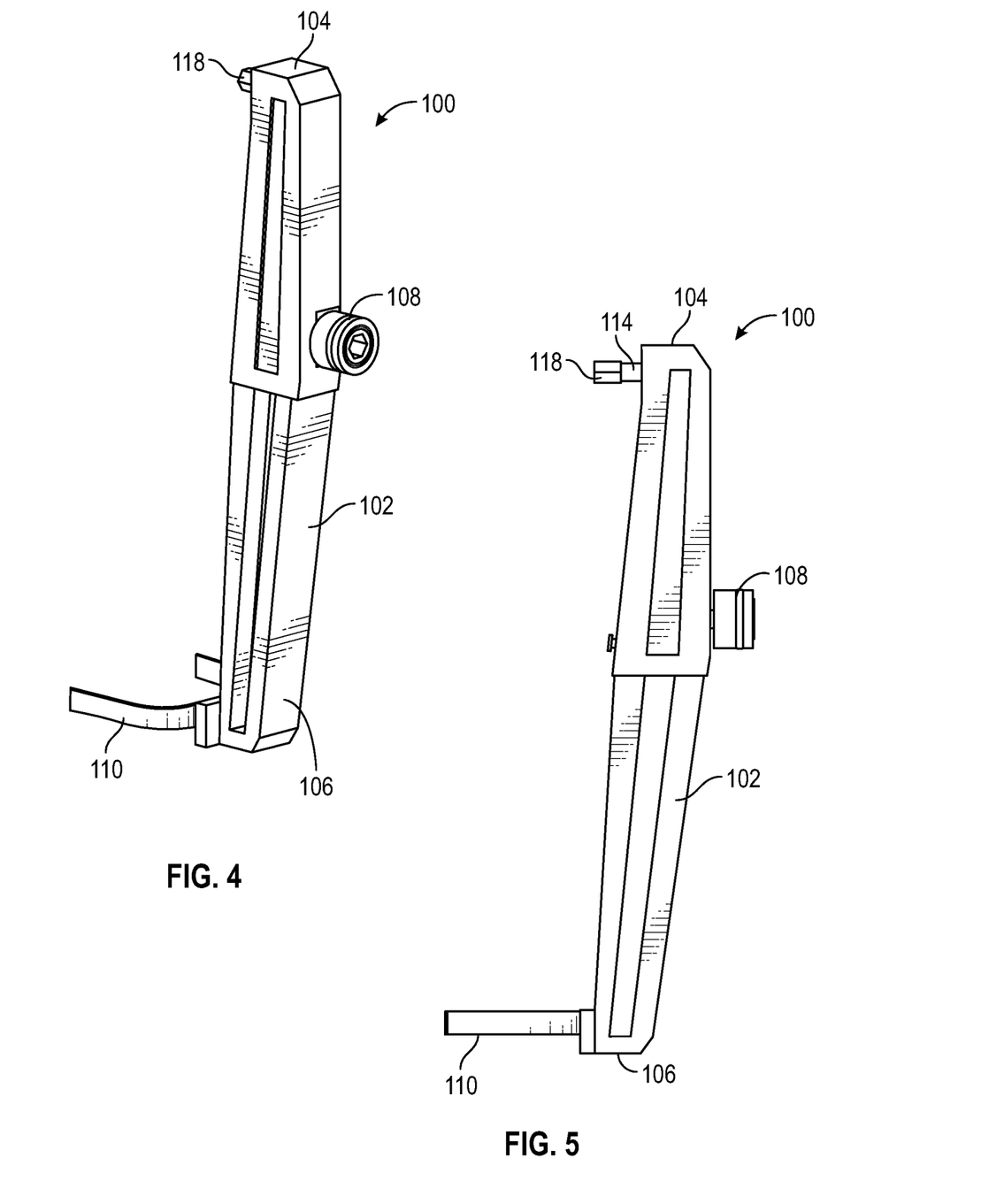
FIG. 4 is a front perspective view of an exemplary embodiment of the drill attachment device of the present invention.
FIG. 5 is a side view of the drill attachment device of the present invention shown in FIG. 4.
Figure 8:
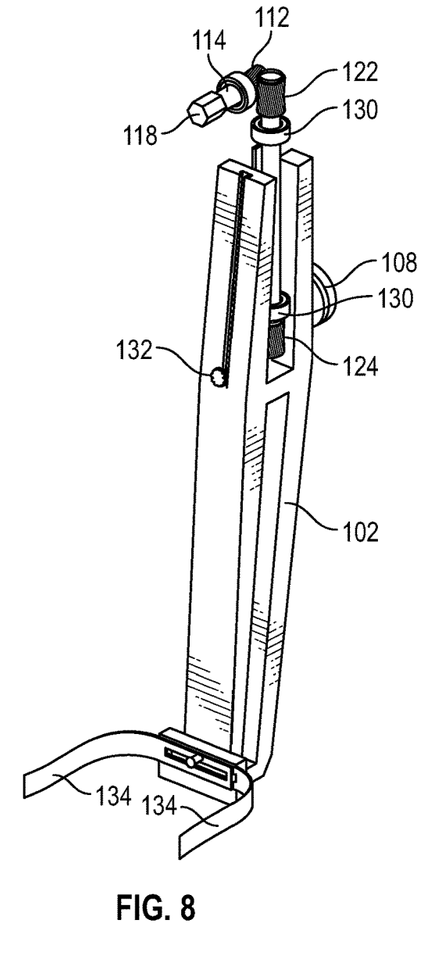
FIG. 8 is a rear perspective view of the drill attachment device of the present invention shown in FIG. 4 with a portion of the top half of the housing shown removed to expose the interior components of the device.
Figure 9:
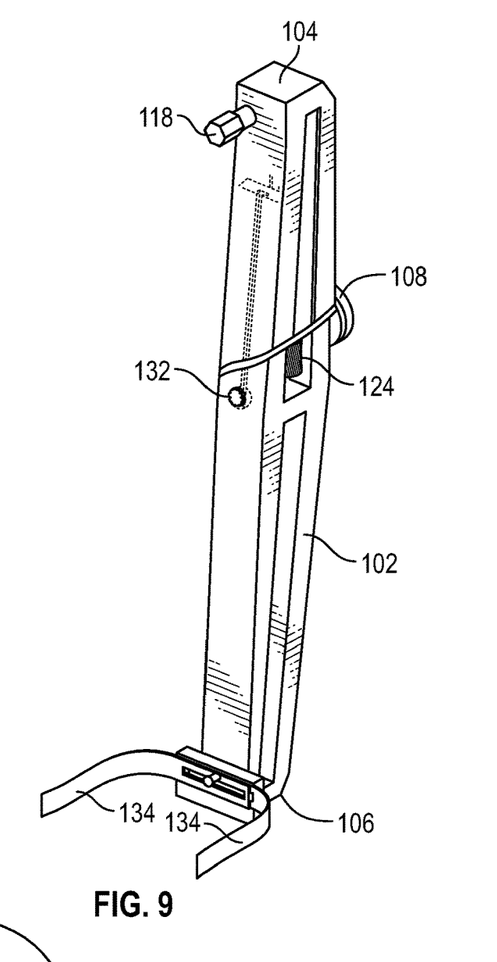
FIG. 9 is a rear perspective view of the drill attachment device shown in FIG. 8 with the most of the top half of the housing of the device shown replaced over the internal components of the device.
Figure 10:
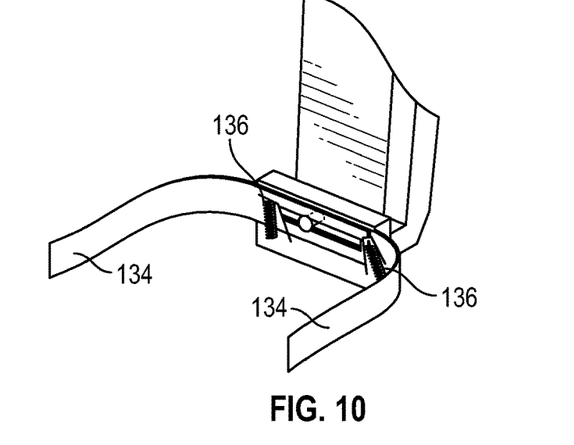
FIG. 10 is a partial magnified view of the drill attachment device of the present invention shown in FIG. 8 showing the attachment means of the device for attaching the bottom of the device to the bottom of a drill or drilling tool.

A front perspective view of an exemplary embodiment of the drill attachment device 100 of the present invention is shown in FIG. 4 and FIG. 5 is a side view of the drill attachment device 100 of the present invention shown in FIG. 4. Drill attachment device 100 includes a vertical elongated housing 102 having a top 104 and a bottom 106, a chuck 108, such as a quick release chuck or a keyless chuck, located on a front exterior surface of the housing 102, and an attachment member 110 connected to an exterior of the housing 102 near the bottom 106 of housing 102 for connecting the bottom 106 of the housing 102 to an existing drill or drilling tool. Drill attachment device 100 also includes a second end 118 of a first short shaft member 114 that is capable of being connected or attached to a chuck of an existing drill or drilling tool (see FIGS. 6-8).

Figures 6, 7:
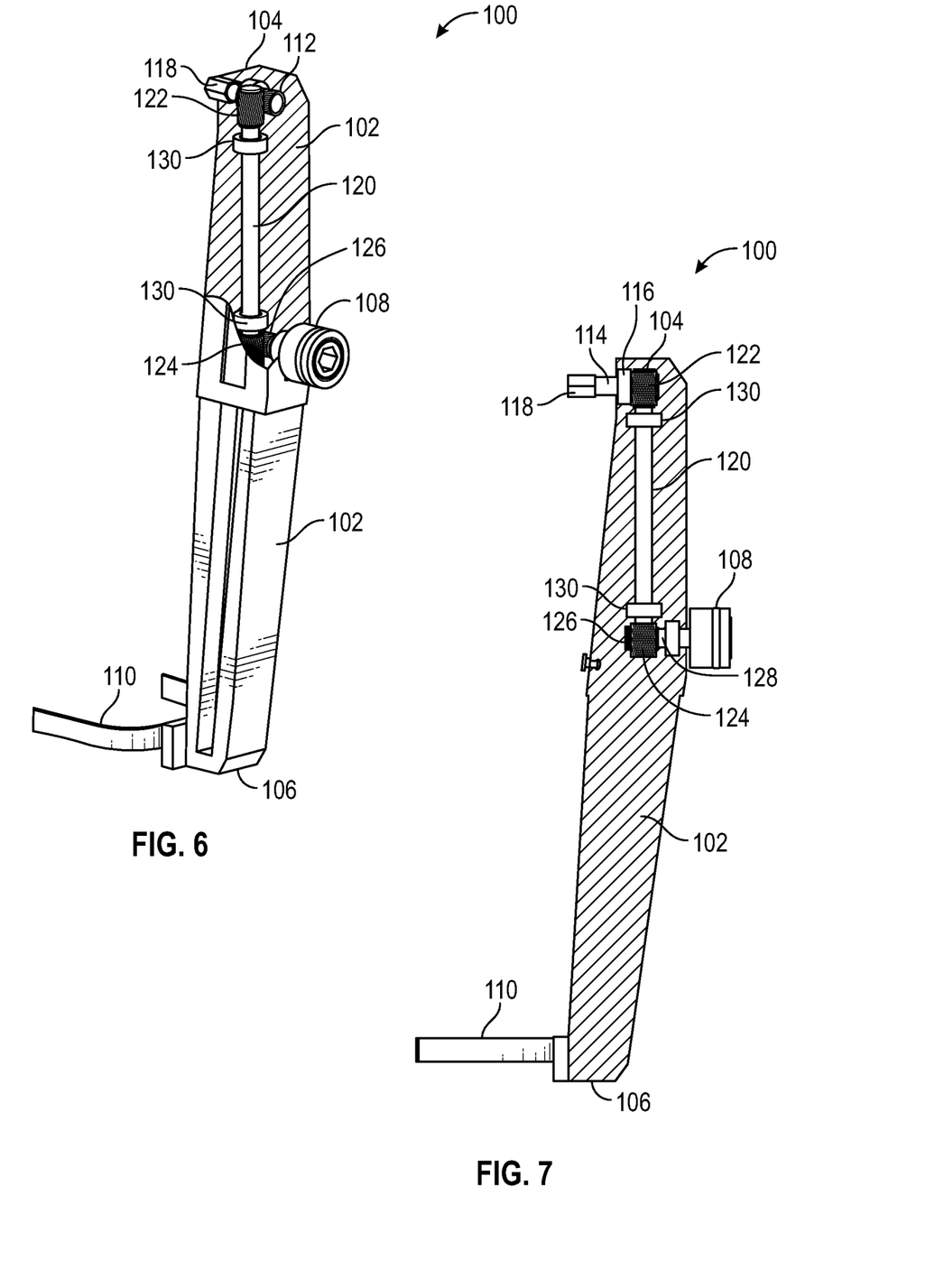
FIG. 6 is the drill attachment device of the present invention depicted in FIG. 4 showing a partial interior view of the drill attachment device with a portion of the exterior housing shown cut away.
FIG. 7 is a side cross-sectional view of the drill attachment device of the present invention shown in FIG. 5 taken along the vertical elongated length of the device.

FIG. 6 is the drill attachment device 100 of the present invention depicted in FIG. 4 showing a partial interior view of the drill attachment device 100 with a portion of the exterior housing 102 shown cut away and FIG. 7 is a side cross-sectional view of the drill attachment device 100 of the present invention shown in FIG. 5 taken along the vertical elongated length of the device. Drill attachment device 100 further includes a first gear 112 contained within the housing 102 near a top end 104 of housing 102, a first short shaft member 114 having a first end 116 attached to the first gear 112 and a second end 118 capable of being attached or connected to a chuck of an existing drill or drilling tool, an elongated drive shaft 120 having a top end and a bottom end contained within a top half of the housing 102, a second gear 122 connected to the top end of the drive shaft 120 such that the second gear 122 is in communication with the first gear 112, a third gear 124 connected to the bottom end of the drive shaft 120, a fourth gear 126 located within the housing 102 near a center of the housing 102 such that the fourth gear 126 is in communication with the third gear 124, and a second short shaft member 128 having a first end and a second end where the second end is connected to the fourth gear 126. The quick release chuck 108 is connected to the second end of the second short shaft member 12 and the attachment member 110 is connected to the housing 102 near a bottom 106 exterior of housing 102. Ball bearings 130 may be positioned on the drive shaft 120 near the second and third gears 122, 124.

First, second, third, and fourth gears 112, 122, 124, 126 may be bevel gears or spline gears. Attachment member 110 may include one or more spring clips 134 and an extension spring 136 that can easily be used to clip the bottom 106 of the drill attachment device 100 to the bottom of a standard drill or drilling tool. The gear system (namely the first, second, third, and fourth gears 112, 122, 124, 126 as well as the elongated drive shaft 120 and first and second short shafts 114, 128) may all be contained within an oil bath contained within the housing 102. The oil bath may comprise only a portion of the interior of the housing 102 such as the top half of the housing.

The drill attachment device 100 may also include an adjustment screw mechanism for raising or lowering the bottom half of the drill attachment device depending on the size of the existing drill or drilling tool that yon are attaching it to. The screw tightens the adjustment mechanism that slides up and down. The vertical elongated housing 102 is narrow in width, i.e. it is clearly considerably longer/higher than it is wide. The housing 102 is preferably made of a suitable lightweight material such as a polymer material or a light weight metal like aluminum, for example, that is strong and durable and that can withstand heat and pressure.

Figure 11:
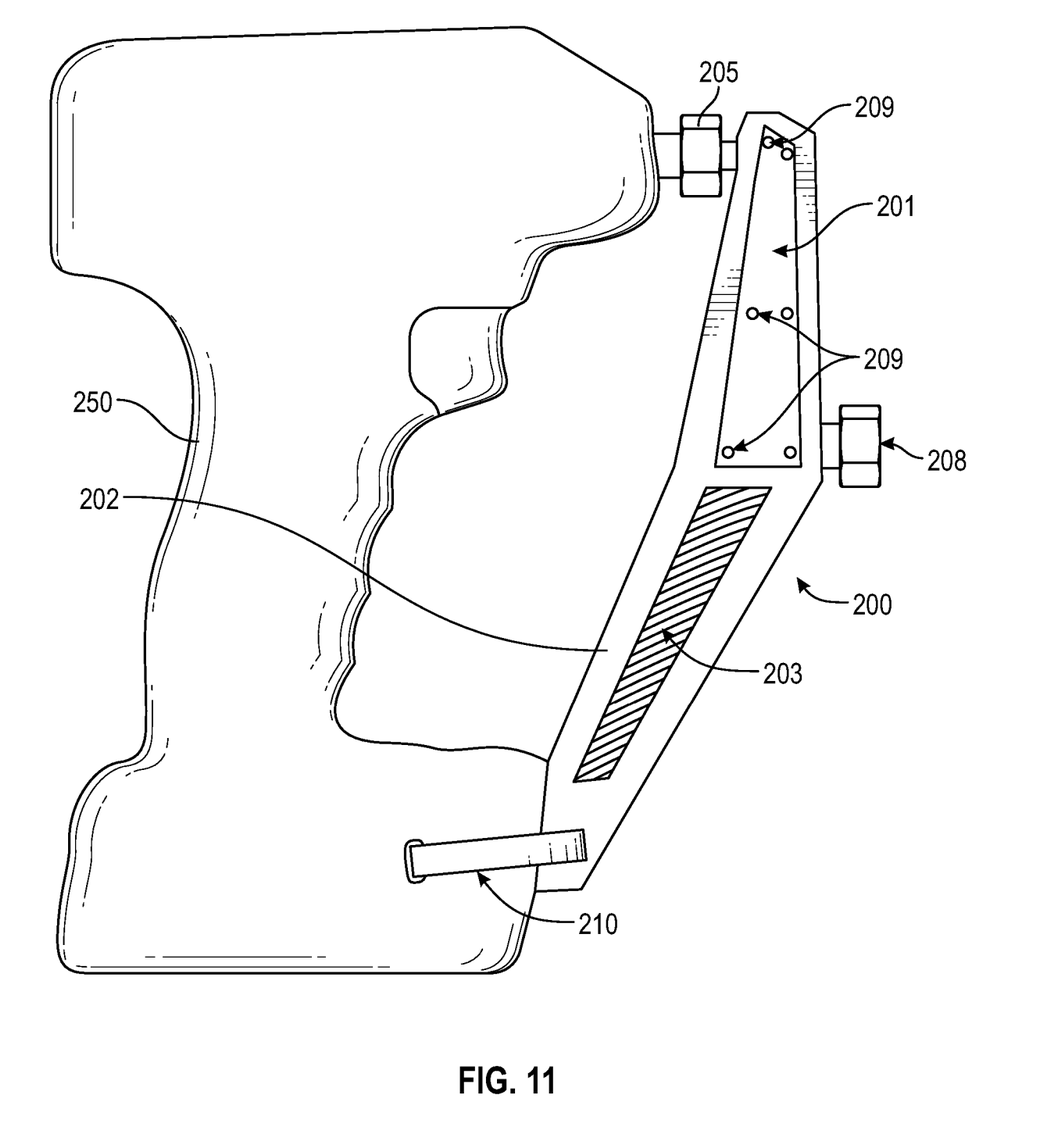
FIG. 11 is a side view of another exemplary embodiment of the drill attachment device of the present invention shown attached to a conventional drill.

FIG. 11 is a side view of another exemplary embodiment of the drill attachment device 200 of the present invention shown attached to a conventional drill 250. The drill attachment device 200 has a vertical elongated housing 202 having a top half 201 and a bottom half 203 that are slightly angled in relation to one another as compared to the vertical elongated housing 102 in the drill attachment device 100 shown in FIGS. 4-9. The interior components of drill attachment device 200 are similar to the internal components of drill attachment device 100 shown in FIGS. 4-9. A top of the housing 202 of drill attachment device 200 is connected to the chuck 205 of conventional drill 250 and a bottom of housing 202 of drill attachment device 200 is attached or connected to a bottom of convention drill 250 by an attachment member 210 such as one or more spring clips, for example. As can be seen in FIG. 11, chuck 208 of drill attachment device 200 is positioned in longitudinal alignment with a center height of the conventional drill 250. Screws 209 may be used to secure opposite sections of the housing 202 together or to secure a front cover onto the housing 202.

The drawings and description of exemplary embodiments of the invention herein shows various exemplary embodiments of the invention. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments that are known or obvious to those reasonably skilled in the art. Additionally, all included examples are non-limiting illustrations of the exemplary embodiments and modes, which similarly avail themselves to any equivalent modes or embodiments that are known or obvious to those reasonably skilled in the art.

Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters, or other operating requirements without departing from the scope of the instant invention and are intended to be included in this disclosure.

Unless specifically noted, it is the Applicant's intent that the words and phrases in the specification and the claims be given the commonly accepted generic meaning or an ordinary and accustomed meaning used by those of ordinary skill in the applicable arts. In the instance where these meanings differ, the words and phrases in the specification and the claims should be given the broadest possible, generic meaning. If any other special meaning is intended for any word or phrase, the specification will clearly state and define the special meaning.

The invention claimed is:

1. A center point drill comprising:
a generally triangular ring shaped housing having an opening in a middle of the housing large enough to insert a user's fingers therethrough;
a battery contained within a first side of the generally triangular ring shaped housing;
a motor, a driver, and a first gear contained with a second side of the generally triangular ring shaped housing;
a second gear contained within a corner of the generally triangular ring shaped housing located between the first and second sides of the housing such that the second gear is in communication with the first gear;
a quick release chuck in communication with the second gear wherein the quick release chuck is located on a flattened face of an exterior corner of the generally triangular ring shaped housing; and
a trigger mechanism contained within the third side of the generally triangular ring shaped housing wherein at least a portion of the trigger mechanism is located on an exterior surface of the middle opening of the generally triangular ring shaped housing.

2. The center point drill of claim 1 further comprising a direction switch connected to the trigger mechanism.

3. The center point drill of claim 1 wherein the first and second gears are bevel gears.

4. The center point drill of claim 1 wherein the first and second gears are spline gears.

5. The center point drill of claim 1 wherein the battery is contained within a compartment that is accessible from an exterior of the housing.

6. The center point drill of claim 1 wherein an outer exterior surface of the third side of the generally triangular ring shaped housing containing the trigger mechanism is slightly rounded to accommodate a user's grip when the user's fingers are placed through the middle opening of the generally triangular ring shaped housing.

7. The center point drill of claim 1 wherein the middle opening of the generally triangular ring shaped housing comprises a generally triangular shape.

8. The center point drill of claim 1 wherein at least a portion of the trigger mechanism contained within the third side of the generally triangular ring shaped housing is in longitudinal alignment with the quick release chuck.

9. The center point drill of claim 1 wherein the generally triangular ring shaped housing is comprised of a top half and a bottom half that can be secured to one another by a plurality of screws.

10. The center point drill of claim 1 wherein the driver comprises an impact spindle and an impact hammer located between the motor and the first gear.

11. The center point drill of claim 1 wherein the generally triangular ring shaped housing further comprises a plurality of openings in a top surface and bottom surface of the housing located near an area of the housing containing the motor to vent heat from an interior of the housing.

* * * * *